(12) United States Patent
Watanabe

(10) Patent No.: US 9,299,500 B2
(45) Date of Patent: Mar. 29, 2016

(54) POWER STORAGE MODULE

(75) Inventor: Katsuhiko Watanabe, Shizuoka (JP)

(73) Assignee: FDK CORPORATION, Tokyo (JP)

( * ) Notice: Subject to any disclaimer, the term of this patent is extended or adjusted under 35 U.S.C. 154(b) by 130 days.

(21) Appl. No.: 13/811,999

(22) PCT Filed: Jul. 27, 2011

(86) PCT No.: PCT/JP2011/067810
§ 371 (c)(1),
(2), (4) Date: Jan. 24, 2013

(87) PCT Pub. No.: WO2012/015068
PCT Pub. Date: Feb. 2, 2012

(65) Prior Publication Data
US 2013/0120910 A1   May 16, 2013

(30) Foreign Application Priority Data

Jul. 30, 2010 (JP) ................................. 2010-171965

(51) Int. Cl.
*H01G 2/10* (2006.01)
*H02B 1/00* (2006.01)
*H02J 7/00* (2006.01)
*H01M 10/50* (2006.01)
*H01G 9/00* (2006.01)
(Continued)

(52) U.S. Cl.
CPC ............. *H01G 9/0003* (2013.01); *H01G 9/155* (2013.01); *H01G 11/06* (2013.01); *H01G 11/12* (2013.01); *H01G 11/18* (2013.01); *H01G 11/82* (2013.01); *H01M 2/1077* (2013.01); *H01M 10/613* (2015.04); *H01M 10/6551* (2015.04); *H01M 10/6555* (2015.04); *Y02E 60/13* (2013.01); *Y02T 10/7022* (2013.01)

(58) Field of Classification Search
CPC .............. H01G 9/06; H01G 9/08; H01G 9/10
USPC ............ 361/517, 676–678; 320/112; 429/120
See application file for complete search history.

(56) References Cited

U.S. PATENT DOCUMENTS

| | | | |
|---|---|---|---|
| 2004/0021442 A1* | 2/2004 | Higashino | H01M 10/0413 320/112 |
| 2006/0037741 A1* | 2/2006 | Tokuhira et al. | 165/185 |
| 2007/0172725 A1* | 7/2007 | Doshi | H01M 6/5038 429/120 |
| 2009/0061299 A1* | 3/2009 | Uchida et al. | 429/156 |

FOREIGN PATENT DOCUMENTS

| | | |
|---|---|---|
| JP | 2005-057007 | 3/2005 |
| JP | 2006-245414 | 9/2006 |

(Continued)

*Primary Examiner* — Eric Thomas
*Assistant Examiner* — Arun Ramaswamy
(74) *Attorney, Agent, or Firm* — Clark & Brody

(57) ABSTRACT

An energy storage module 11 comprises a case 21, a plurality of stacking plates 41, a heat-transferring metal plate 51 and a heat-releasing fin 61. An exposure outlet 23 is provided on the side 21 of the case 22 containing a plurality of energy storage cells 31. The stacking plate 41 having an aperture 42 is located between the plurality of energy storage cells 31 and is latched to another stacking plate 41 to position said plate. The heat-transferring metal plate 51 having a flat plate portion 52 and a bent portion 53 is provided in face-to-face contact with the main face 33 of each cell of the energy storage cells 31. The heat-releasing fin 61 projects from the exposure outlet 23 to the outside of the case 21 and is thermally face-to-face bonded to the bent portion 53 of the heat-transferring metal plate 51 by the insulation sheet 65.

2 Claims, 3 Drawing Sheets

(51) Int. Cl.
*H01G 11/06* (2013.01)
*H01G 11/12* (2013.01)
*H01G 11/18* (2013.01)
*H01G 11/82* (2013.01)
*H01M 2/10* (2006.01)
*H01M 10/6551* (2014.01)
*H01M 10/6555* (2014.01)
*H01M 10/613* (2014.01)

(56) References Cited

FOREIGN PATENT DOCUMENTS

| | | |
|---|---|---|
| JP | 2009-252501 | 10/2009 |
| JP | 2009-252553 | 10/2009 |
| JP | 2010-010460 | 1/2010 |

* cited by examiner

POWER STORAGE MODULE

TECHNICAL FIELD

This invention relates to an energy storage module comprising a structure in which a plurality of energy storage cells as well as power generating elements in an electrolyte solution are stored inside a metal laminated film material. Especially this invention relates to the aforementioned energy storage module characterized by having a heat dissipation structure and an insulation structure.

BACKGROUND ART

An energy storage device which can store a massive amount of energy and which can rapidly charge and discharge is required for electric load-leveling (load-control) equipment as well as solar-power generation, wind-power generation or the like and for momentary-voltage drop-prevention systems using electronic hardware such as computers or the like and for energy-regeneration systems or the like used in electric vehicles and hybrid cars. Conventional types of lead batteries or other secondary batteries, which are not suitable for a high current charge-discharge and which have a short cycle life, have difficulties in being applied to such energy storage systems. As a new type of energy storage device to resolve such problems, a non-aqueous energy storage device draws now much attention.

As a rapid charge-discharge and longer-lasting non-aqueous energy storage device, a lithium-ion capacitor is currently suggested. The lithium-ion capacitor has a structure of soft aluminum laminated film of electrode laminates therein positive and negative electrodes and separators are layered in an organic electrolyte solution containing lithium-ion. Also, an energy storage module (lithium-ion capacitor module) such as said lithium-ion capacitor used as a single cell or as a plurality of cells connected in parallel or in series to obtain a large amount of electricity is now suggested.

However, constant charging and discharging done with this type of energy storage module causes a single cell to generate heat, thus raising the temperature of the whole module. Especially, when using an energy storage module having a structure encasing a plurality of single cells laminated therein, the heat inside the module will not easily be released, thereby causing the temperature of the module to rise, thus ephemeralizing or damaging the module. Even if there is no such ephemeralization or damage, temperature unevenness within each module causes a difference in capacitance or internal resistance of each cell, thus totally disabling the module.

As described above, to stably operate an energy storage module that often charges and discharges for a long time, it is necessary to sufficiently release the inner heat to the outside of the module. Regarding countermeasures against such a heat problem, some energy storage modules having a heat-releasing structure were conventionally suggested. (See for example Patent References 1, 2 or the like, below). Patent References 1 and 2 describe the energy storage modules forming a heat-releasing pathway in which a good-conductor-of-heat made of a flat metal located between the single cells and the edge is connected to a heat-releasing fin, thus allowing the heat of the single cell to be released out of the container, or the like.

Patent Reference 1: JP-A-2005-57007
Patent Reference 2: JP-A-2009-252501

SUMMARY OF THE INVENTION

Problems to be Solved by the Invention

To use the conventional art of the aforementioned energy storage module, the laminates consisting of a plurality of cells are stored in the container or the like. However, to further strengthen the module, a metal container is generally used. In this case, a heat-releasing fin, for example, is provided on the outer surface of the metal case, and the edge of the good-conductor-of-heat is connected to the inner side of the metal case.

Meanwhile, since the insulation resistance value of the terminal of the single cell and the aluminum-laminated film is set low, if said aluminum-laminated film of the single cell that is exposed outside is used as a primary circuit component, it is necessary to provide insulation between the single cell and the metal case, based on a certain level of safety standards. However, when using the aforementioned conventional modules, conduction occurs between the single cell and the metal case or between the good- conductor-of-heat connected to the single cell and the metal case, thus making it impossible to provide insulation to meet the required safety standards.

To avoid the above problem, it is thought possible to provide insulation by wrapping each single cell with, for example, an insulation sheet or the like. However, such a method makes the manufacturing cost of the single cell high, thus making the manufacturing of the whole module costly.

This invention was achieved in the light of the aforementioned problems to provide an energy storage module that makes it possible to control a rise in temperature of the module due to an increase of heat and to prevent the module from ephemeralization and from being damaged, thus maximizing the property of the module with a uniform temperature and providing proper insulation corresponding to the required safety standards.

Means for Solving the Problems

Means to solve the problems are described hereinafter.

(1) The first aspect of this invention is referred to as an energy storage module comprising a structure in which a plurality of energy storage cells, as well as power-generating elements in an electrolyte solution, are stored inside a metal-laminated film material, with the plurality of energy storage modules being provided face to face, thus forming layers to be connected in series or in parallel, characterized in that the energy storage module comprises a case with an exposure outlet on the side for containing a plurality of the energy storage cells, a plurality of stacking plates made of plate frame parts with an aperture provided between the energy storage cells, latched to next another stacking plate thus positioning each other, a heat-transferring metal plate having a flat plate portion affixed to the stacking plate covering the aperture and a bent portion to bend at right angle an edge of the flat plate portion located on the exposure outlet provided in face to face contact with each cell of the energy storage cells, and a heat-releasing fin thermally bonded face-to-face to the bent portion of the heat-transferring metal plate by the heat-transferring insulation sheet projecting from the exposure outlet leading to the outside of the case.

Thus, in the first aspect of this invention, the main face of each cell of the energy storage cell is in face-to-face contact with the flat plate portion of the heat-transferring metal plate, so that the energy storage cell is thermally bonded to the heat-transferring metal plate in perfect order. Also, the bent portion of the heat-transferring metal plate is in face-to-face contact with the heat-releasing fin by the heat-transferring insulation sheet, so that the heat-transferring metal plate is thermally bound to the heat-releasing fin. Thus, the heat that is generated by the energy storage cell efficiently transfers to the heat-releasing fin through the flat plate portion and the bent portion of the heat-transferring metal plate and through the heat-transferring insulation sheet and is eventually is released out the case. Therefore, the rise in temperature by the heat in the module is controlled so as to prevent the module from ephemeralization or from being damaged. By the use of such a structure, even if there is temperature variation between the energy storage cells, such unevenness of temperature is averaged, since the heat is transferred from the higher to the lower cells through the heat-releasing fins, thus making it possible to maximize the energy storage property of the module. Also, the heat-transferring metal plate and the heat-releasing fin provided on the exposure outlet are insulated by using the heat-transferring insulation sheet, thus maintaining a favorable heat-releasing performance and making it possible to insulate the module according to the required safety standards. In addition, the stacking plates are latched together and positioned next to each other, and the heat-transferring metal plate is also affixed to said stacking plates, so that the heat-transferring metal plates and the heat-releasing fins will not easily get out of position, thus ensuring said plates and fins of being thermally bound in a good condition, so that the module is well protected against vibration and impact shock.

(2) An energy storage module, according to the above first aspect of the invention, is characterized in that the aforementioned insulation case is made of resin, and that the aforementioned heat-releasing fin is provided on the case with a metal fitting affixed to the outside of the case.

Thus, in the second aspect of this invention, the insulation case made of resin is used as a container for the energy storage cell, thus making it possible to insulate the energy storage cell according to the safety standards required for each energy storage cell and insulation case and to reduce the weight of the entire module. Also, the heat-releasing fin is indirectly provided on the insulation case of resin by using the metal fitting affixed to the outside of the insulation case and not directly on the insulation case of resin, thus making it possible to surely affix the heat-releasing fin, thereby improving the protection of the module against the vibration and impact shock.

(3) An energy storage module, according to the first or second aspect of this invention, is characterized in that the aforementioned bent portion of the metal plate is bent along the side of the aforementioned stacking plates.

The third aspect of this invention allows the bent portion of metal plate to be supported and pressed from behind by using the stacking plate. Thus, even if, for example, a plurality of heat-transferring metal plates are used, face-to-face contact of each bent portion is aligned, so that such face-to-face contact of the bent portions and of the heat-releasing fins by the heat-transferring insulation sheet is surely maintained, thus improving resistance to vibration and impact shock.

Effect of the Invention

As described above, the first to third aspects of this invention provides an energy storage module that makes it possible to control a rise in temperature of the module due to an increase of heat and to prevent the module from ephemeralization and from being damaged, thus ensuring a uniform temperature of the module, and providing proper insulation according to the required safety standards.

MODES FOR CARRYING OUT THE INVENTION

Hereinafter, Energy Storage Module 11 as the embodiment of this invention is described with reference to the drawings.

Figure 1:
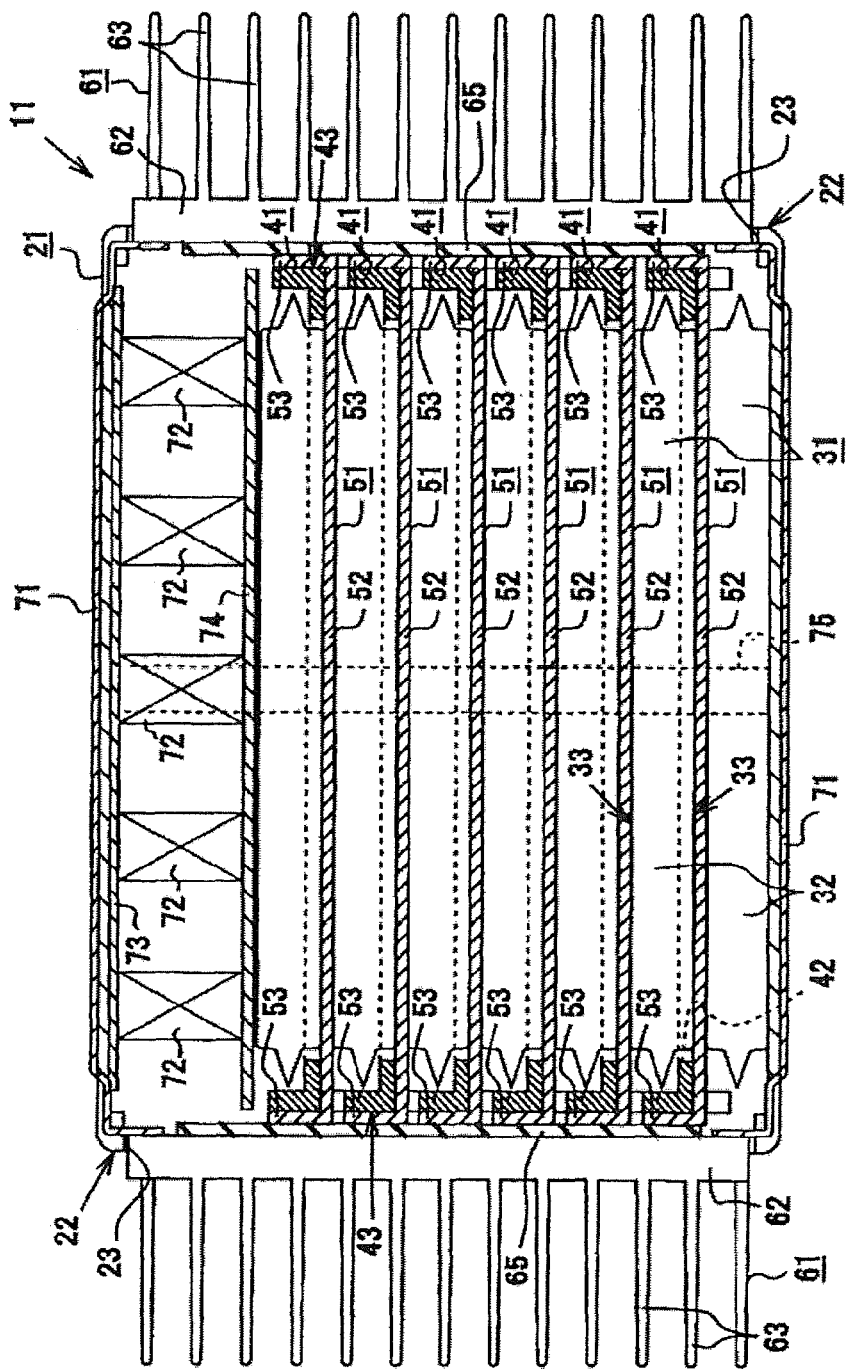
FIG. 1 is the cross-sectional view of the energy storage module as one embodiment of this invention.

As shown in FIG. 1, the energy storage module 11 of the embodiment of this invention is a lithium-ion capacitor module having an insulation case 21 containing a fuel-cell stack structure containing therein a plurality of energy storage cells 31, a plurality of stacking plates 41 and a plurality of heat-transferring metal plates 51.

Figure 4:
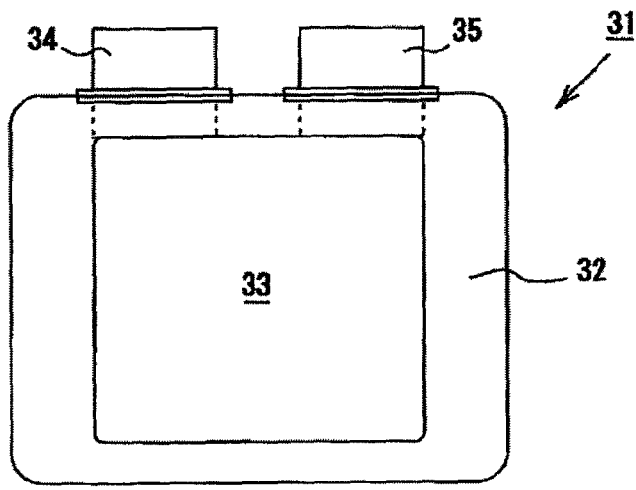
FIG. 4 is the front view showing the energy storage cell within the energy storage module of the above embodiment.

As shown in FIG. 4, an energy storage cell 31 is a lithium-ion capacitor cell comprising a polar laminated body having a laminated positive and negative electrode as well as separators and having plural units of laminated electric generating elements, with the positive and negative electrodes being oppositely located by a separator in each unit of the electric generating element.

The positive electrode is a structure made of materials reversely supporting the lithium ion formed on a positive current collector which supports the positive electrode in collecting the current and which is formed as a conductive metal plate made of, for example, aluminum. The positive current collector is formed rectangularly, with a tab projecting from one of its four sides. The tab is connected to a positive relay terminal 34 made of aluminum.

The negative electrode is a structure made of materials reversely supporting the lithium-ion formed on a negative current collector which supports the negative electrode in collecting the current and which is formed as a conductive metal plate made of, for example, copper. The negative current collector is formed rectangularly, with a tab projecting from one of its four sides. The tab is connected to a negative relay terminal 35 made of copper.

A place for attaching lithium is provided on the negative current collector and therein said collector a lithium metallic foil for pre-doping is provided, which melts and disappears when pre-doping is competed.

As for the energy storage cell 31 of this invention, the electrode laminated body, as well as the electrode solution, are hermetically stored within the aluminum laminated film material 32 which is processed into a rectangular pouch. The mouth of the aluminum laminated film material 32 is heat-sealed. Such heat-sealing is done whilst inserting the positive relay terminal 34 and the negative relay terminal 35 into the heat-sealing position.

As such, when the electrode laminated body is stored within the aluminum laminated film material 32, the positive relay terminal 34 and the negative relay terminal 35 are both projected from one side (the top side, as shown in FIG. 4).

Also, metallic laminated films other than aluminum foil can be used and formed rectangularly.

Figure 5:
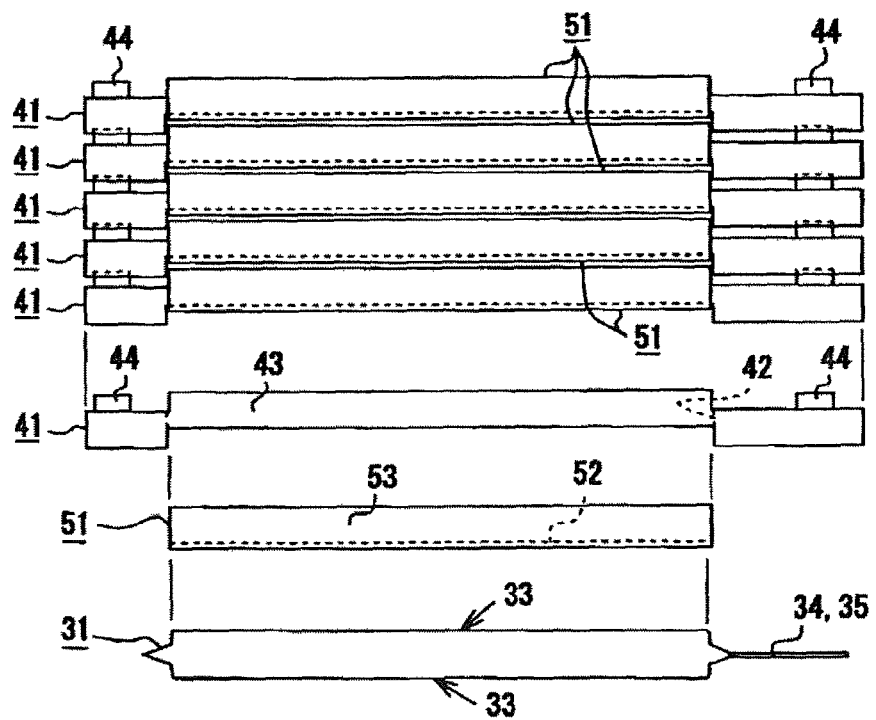
FIG. 5 is the schematic view of the above embodiment explaining the layers of the stacking plates, the heat-transferring metal plates and the energy storage cells.

Of the energy storage module 11 of this invention, the main face 33 of each energy storage cell 31 faces each other (top to bottom, as shown in FIGS. 1 and 5) and are laminated to the stacking plates 41 or the like between the energy storage cells 31. Regarding the energy storage cells 31 provided one above the other, the positive relay terminal 34 of one energy storage cell 31 is welded to the negative relay terminal 35 of another energy storage cell 31, so that each energy storage cell 31 is electrically arranged in series.

As shown in FIGS. 1 and 5, the stacking plates 41 of this invention are made of material formed rectangularly, with a plate frame comprising an aperture 42 provided in the center of its flat portion, with, for example, the material being made of a fire-retardant resin such as fire-retardant polypropylene, glass-containing nylon, or the like. A stacking plate 41 is provided between each energy storage cell 31. The wall surrounding the stacking plates 41 extends perpendicularly to the flat portion of the aperture 42, with a positioning projection 44 being provided at the corner of the stacking plate 41 which is latched to another adjacent stacking plate 41. Each positioning projection 44 projects toward the plate thickness of the stacking plate 41 which is latched to another stacking plate 41 to position each stacking plate 41, thus simultaneously positioning the plurality of the energy storage cells 31.

As shown in FIGS. 1 and 5, the plurality of heat-transferring metal plates 51 of this invention is a plane rectangular-shaped plate made of highly heat-conductive aluminum or the like. The heat-transferring metal plate 51 comprises a flat plate portion 52, and both ends thereof are bent at a right angle in the same direction so as to become a bent portion 53. Thus, the heat-transferring metal plate 51 has a nearly U-shaped cross section. The flat plate portion 52 is affixed to the stacking plate 41 so as to cover the aperture 42. Also, the flat plate portion 52 of the heat-transferring metal plate 51 is provided in contact with the main face 33 of the cell of the energy storage cell 31.

The bent portion 53 of each heat-transferring metal plate 51 is projected from a notch provided on the surrounding wall and is in contact with the side 43 of the stacking plate 41, thus, supporting the bent portion 53 from behind, thereby ensuring that each surface is aligned on the same plane. The bent portion 53 is not in contact with each other but have a certain clearance between each other.

Figure 2:
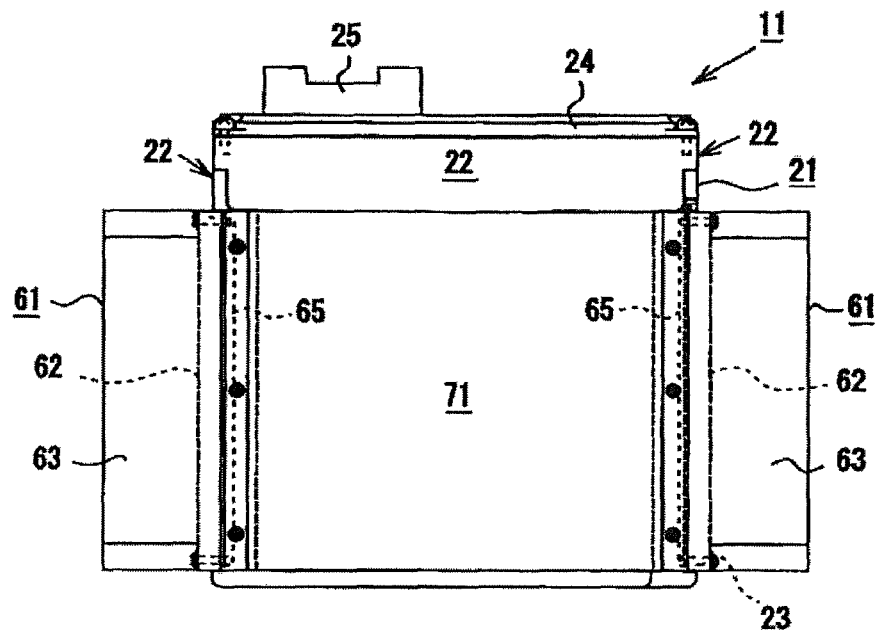
FIG. 2 is the front view showing the energy storage module of the above embodiment.
Figure 3:
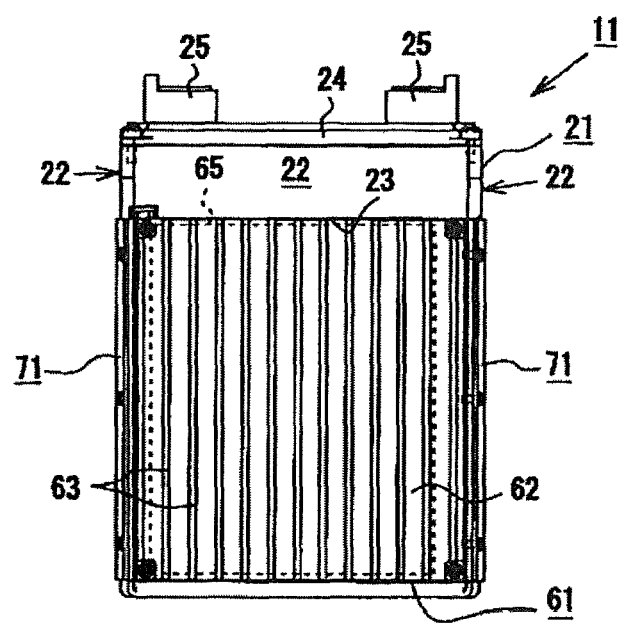
FIG. 3 is the left-side view showing the energy storage module of the above embodiment.

As shown in FIGS. 1, 2 and 3, the insulation case 21 containing the aforementioned fuel-cell stack structure is a box with an open top and a closed bottom, made of insulation resin, which has a lid 24 to cover the open top. A pair of module output terminal 25 with a certain amount of space between them is provided on the top of the lid 24, with each terminal being electrically connected to the positive relay terminal 34 and the negative relay terminal 35, respectively. The insulation case 21 has four sides 22. A plane rectangular exposure outlet 23 is widely formed on two of the four sides 22 (the right and left sides, as shown in FIG. 2). The fuel-cell stack structure consisting of a plurality of the energy storage cells 31, a plurality of the stacking plates 41 and a plurality of the heat-transferring metal plates 51 are stored within the space of the insulation case 21. As shown in FIG. 1, both ends of the plurality of the heat-transferring metal plates 51 (i.e. the plurality of the bent portions 53 of which each side is aligned) comprising the fuel-cell stack structure are positioned on the two exposure outlets 23, respectively.

As shown in FIG. 1, a fuel-cell stack pressure structure consisting of a coil spring supporting member 73, a pressure plate 74 and a plurality of coil springs 72 or the like, which lie between the coil spring supporting member 73 and the pressure plate 74, is stored in a space behind the aforementioned fuel-cell stack structure within the insulation case 21. Due to the fuel-cell stack pressure structure, such laminated things are equally pressed in the direction of thickness (i.e. in the laminated direction), and the flat plate portion 52 of the heat-transferring metal plate 51 is provided in contact with the main face 33 of the cell of each energy storage cell 31. Also, the fuel-cell stack structure and the fuel-cell stack pressure structure are fixed respectively by using a metal fitting 75 for affixing the cell stack.

As shown in FIGS. 1, 2 and 3, an energy storage module 11 of the embodiment of this invention comprises a pair of heat-releasing fin 61, which is formed by, for example, a highly heat-conductive aluminum or the like. A plurality of fin portion 63, formed like a comb, is provided on the outer surface of the flat base portion 62. Each fin portion 63 extends vertically from the insulation case 21. A heat-transferring insulation sheet 65 of a few millimeters thick, having a higher property of heat-transferring than an ordinary insulation sheet of resin, is attached to the internal surface of the base portion 62. Such a favorable heat-transferring insulation sheet 65 includes, for example, a sheet mainly made of silicon resin or the like or of a sheet mainly made of acryl resin. The internal surface of the base portion 62 is in contact with the face made of a plurality of the bent portion 53 evenly aligned. In other words, a pair of the heat-releasing fins 61 are thermally bound on the bent portion 53 of the heat-transferring metal plate 51 by the heat-transferring insulation sheet 65 and are projected respectively from the two exposure outlets 23 to the outside of the insulation case 21.

The heat-releasing fin 61 is not provided directly but indirectly on the outer side of the insulation case 21 by using the metal fitting 71 which, of this embodiment, is a part formed of a folded metal plate and allocated along the other two of the four sides 22 and affixed to the insulation case 21 by a screw. Also, the metal fitting 71 does not make contact with the metallic parts such as the energy storage cell 31 and the heat-transferring metal plate 51.

In the aforementioned energy storage module 11, the main face 33 of the cell of each energy storage cell 31 is in face-to-face contact with the flat plate portion 52 of the heat-transferring metal plate 51, thus thermally binding the energy storage cell 31 to the heat-transferring metal plate 51 in perfect order. Also, the bent portion 51 of the heat-transferring metal plate 51 is in face-to-face contact with the heat-releasing fin 61 by the heat-transferring insulation sheet 65, thus thermally binding the heat-transferring metal plate 51 to the heat-releasing fin 61 in perfect order. Therefore, the heat that is generated by the charging and discharging of the energy storage cell 31, whilst the energy storage module 11 being used, is efficiently transferred to the base portion 62 of the heat-releasing fin 61 by the flat plate portion 52 and bent portion 53 of the heat-transferring metal plate 51 and the heat-transferring insulation sheet 65, being thus released mainly from the surface of the fin portion 62 of the heat-releasing fin 61 and eventually released outside of the insulation case 21.

Therefore, the embodiment of this invention offers the effects, below.

(1) By using the energy storage module 11 of this embodiment, as described above, a rise in temperature due to the heat in the module is controlled so as to prevent the module from ephemeralization or from being damaged. In such a structure, even if there is temperature variation between the energy storage cells 31, such unevenness of temperature in the cells is averaged, since the heat is transferred from the higher to the lower cells through the heat-releasing fins 61, thus making it possible to maximize the energy storage property of the module.

(2) In the energy storage module 11 of this embodiment, the heat-transferring metal plate 51 and the heat-releasing fin 61 provided on the exposure outlet are insulated by the heat-transferring insulation sheet 65, thus maintaining a favorable heat-releasing performance and making it possible to insulate the module according to the required safety standards. In using this structure, to avoid problems about insulation, it is unnecessary to provide insulation by wrapping each single cell with, for example, an insulation sheet or the like. Therefore, such a method reduces not only the cost of manufacturing a single cell but also the cost of the whole module.

(3) In the energy storage module 11 of this embodiment, the stacking plates 41 are latched together and positioned next to each other, with the heat-transferring metal plates 51 being affixed to them. Thus, the heat-transferring metal plates 51 and heat-releasing fins 61 will not easily get out of position, thus ensuring that said plates and fins are thermally bonded well, so that the module is well protected against vibration and impact shock.

(4) In the energy storage module 11 of this embodiment, the insulation case 21 made of resin is used as the container for the energy storage cell 31, thus making it possible to insulate said energy storage cell 31 according to the safety standards required for each energy storage cell 31 and insulation case 21 as well as reducing the weight of the entire module, which would not be the result if a metal case were used.

(5) In the energy storage module 11 of this embodiment, the heat-releasing fin 61 is indirectly provided on the insulation case 21 made of resin by using the metal fitting 71 affixed to the outside of said case and not directly on it. In using the insulation case 21 made of resin, thus being of lesser intensity than a case made of metal, the heat-releasing fin 61 is firmly fixed, thus improving the protection of the module against vibration and impact shock. Also, the surface where the metal fitting 71 extends is different from that where the heat-releasing fin 21 and module-output terminal 25 project. Thus, the metal fitting 71 is not an obstruction when installing the module.

(6) In the energy storage module 11 of this embodiment, the bent portion 53 of the metal plate is bent along the side 43 of the aforementioned stacking plates 41, so that the said bent portion 53 is supported and pressed from behind by the side 43 of the stacking plate 41. Thus, even if, for example, a plurality of heat-transferring metal plates 51 are used, face-to-face contact of each bent portion 53 is aligned, thus ensuring that face-to-face contact of said bent portions 53 and the heat-releasing fins 61, by the heat-transferring insulation sheet 65, is maintained to improve the resistance of the module to vibration and impact shock.

The embodiment of this invention can be varied as described below.

The aforementioned embodiment includes but is not limited to a structure of which the positive relay terminal 34 and the negative relay terminal 35 of the energy storage module 11 extend from one side of the energy storage cell in the same direction. Yet, it is possible that they extend oppositely from two opposite sides of the energy storage cell 31 or that they extend at a right angle from each other from two sides of the energy storage cell 31.

The aforementioned embodiment includes but is not limited to the heat-transferring insulation sheet 65 attached to the base portion 62 of the heat-releasing fin 61. Yet, for example it is possible to form the layered heat-transferring insulation laminates by applying gels which are mainly made of silicon resin or the like.

The aforementioned embodiment includes but is not limited to the stacking plate 41 having the flat plate portion 52. Yet, for example, it is possible that the embodiment comprises only the frame wall without having the flat portion 52. Also, of the aforementioned embodiment, the stacking plate 41 and the heat-transferring metal plate 51 are separately manufactured. However, instead those parts can be integrally manufactured by, for example, insert molding the said parts.

The aforementioned embodiment represents the energy storage cell 31 of a lithium pre-dope type of lithium-ion capacitor. Yet, it is possible to materialize an energy storage cell of an alkaline metallic ion capacitor which is pre-doped not by an alkaline metal but by a lithium one. It is also possible to materialize an energy storage cell of a non-aqueous secondary battery or of an electric double-layer capacitor.

DESCRIPTION OF REFERENCE SIGNS

11: Energy storage module
21: Insulation case as the case
22: Side of the case
23: Exposure outlet
31: Energy storage cell
32: Aluminum-laminated film material as the metal laminated film material
33: Main face of the cell
41: Stacking plate
42: Aperture
43: Side of the stacking plate
51: Heat-transferring metal plate
52: Flat plate portion
53: Bent portion
61: Heat-releasing fin
71: Metal fitting

What is claimed is:

1. An energy storage module comprising a structure in which a plurality of energy storage cells, as well as power-generating elements in an electrolyte solution, are stored inside a metal-laminated film material, with the plurality of energy storage modules being provided face to face, pressed in a direction of lamination of the metal, thus forming layers to be connected in series or in parallel, characterized in that the energy storage module comprises:

a case forming a box with four sides, with an exposure outlet provided on one or two sides of the case, the case completely surrounding the plurality of the energy storage cells, a plurality of stacking plates made of plate frame parts with an aperture and a positioning projection provided between the energy storage cells, the positioning projection detachably engaged to an adjacent stacking plate thus positioning each other, a heat-transferring metal plate having a flat plate portion affixed to the stacking plate covering the aperture and a bent portion to bend at right angle an edge of the flat plate portion located on the exposure outlet provided in face to face contact with each cell of the energy storage cells, and a heat-releasing fin projecting from the exposure outlet leading to an outside of the case and a heat-transferring insulation sheet thermally face-to-face bonding the bent portion and the heat-releasing fin, wherein only the heat releasing fin is projected from the exposure outlet leading to an outside of the case, characterized in that the case is made of resin, therein a metal fitting is formed by bending a metallic plate, the metal fitting contiguously provided on an outer surface of the case that does not have the exposure outlet, and that the heat-releasing fin is indirectly provided on the case with the metal fitting affixed to the outside of the case.

2. An enemy storage module comprising a structure in which a plurality of energy storage cells, as well as power-generating elements in an electrolye solution, are stored inside a metal-laminated film material, with the plurality of energy storage modules being provided face to face, pressed in a direction of lamination of the metal, thus forming layers to be connected in series or in parallel, characterized in that the energy storage module comprises:

a case forming a box with four sides, with an exposure outlet provided on one or two sides of the case, the case completely surrounding the plurality of the energy storage cells, a plurality of stacking plates made of plate frame parts with an aperture and a positioning projection provided between the energy storage cells, the positioning projection detachably engaged to an adjacent stacking plate thus positioning each other, a heat-transferring metal plate having a flat plate portion affixed to the stacking plate covering the aperture and a bent portion to bend at right angle an edge of the flat plate portion located on the exposure outlet provided in face to face contact with each cell of the energy storage cells, and a heat-releasing fin projecting from the exposure outlet leading to an outside of the case and a heat-transferring insulation sheet thermally face-to-face bonding the bent portion and the heat-releasing fin, wherein only the heat releasing fin is projected from the exposure outlet leading to an outside of the case, characterized in that the bent portion of the heat-transferring metal plate is bent along a side of the stacking plates.

* * * * *

UNITED STATES PATENT AND TRADEMARK OFFICE
CERTIFICATE OF CORRECTION

| | |
|---|---|
| PATENT NO. | : 9,299,500 B2 |
| APPLICATION NO. | : 13/811999 |
| DATED | : March 29, 2016 |
| INVENTOR(S) | : Watanabe |

It is certified that error appears in the above-identified patent and that said Letters Patent is hereby corrected as shown below:

Claims

Column 9, Line 7, Claim 2:

"2. An enemy storage module comprising a structure in"

should read:

"2. An energy storage module comprising a structure in"

Signed and Sealed this
Twelfth Day of July, 2016

Michelle K. Lee
*Director of the United States Patent and Trademark Office*